United States Patent
Rösgen et al.

[11] 3,947,832
[45] Mar. 30, 1976

[54] SYSTEM FOR PROTECTING PERSONS UNDERGROUND FROM DANGEROUS AREAS

[75] Inventors: Karl Rösgen, Essen-Heisingen; Klaus Noack, Essen-Kray, both of Germany

[73] Assignee: Bergwerksverband GmbH, Essen, Germany

[22] Filed: May 20, 1971

[21] Appl. No.: 145,199

[30] Foreign Application Priority Data
May 29, 1970 Germany............................ 2026167
May 29, 1970 Germany............................ 2026168

[52] U.S. Cl. .................. 340/224; 325/118; 325/37
[51] Int. Cl.² ............................................. G08B 1/08
[58] Field of Search ....... 340/279, 224, 258 D, 421, 340/419, 52 H; 343/225, 228; 318/16; 325/37, 111, 118, 364; 179/82

[56] References Cited
UNITED STATES PATENTS

| | | |
|---|---|---|
| 3,183,443 | 5/1965 | Lefevre............................... 325/118 |
| 3,225,265 | 12/1965 | Krause et al........................ 317/138 |
| 3,309,690 | 3/1967 | Moffitt............................ 340/258 R |
| 3,315,263 | 4/1967 | Lefevre............................... 343/225 |
| 3,348,226 | 10/1967 | Fischer................................ 325/37 |
| 3,582,931 | 6/1971 | Nawrocki............................ 340/258 |

*Primary Examiner*—Thomas B. Habecker
*Attorney, Agent, or Firm*—Michael J. Striker

[57] ABSTRACT

Each person underground in the mine carries in his helmet lamp a continuously operating transmitter the signal of which is detected by a receiver. The receiver or the antenna thereof is installed, in one embodiment, in a Faraday cage that surrounds the dangerous area, such as the feed side of the crushing machine or the delivery end of a conveyor. In another embodiment, directional antennas are located at the approaches to a blasting area, for example. In either case, when a signal is detected indicating the presence of a person in the danger zone, in the case of the Faraday cage, or near the danger zone, the conveyor is stopped or a warning is sounded, as the case may be.

17 Claims, 11 Drawing Figures

MINER'S HEAD LAMP CONTAINING CONTINUOUSLY OPERATING SIGNAL TRANSMITTER

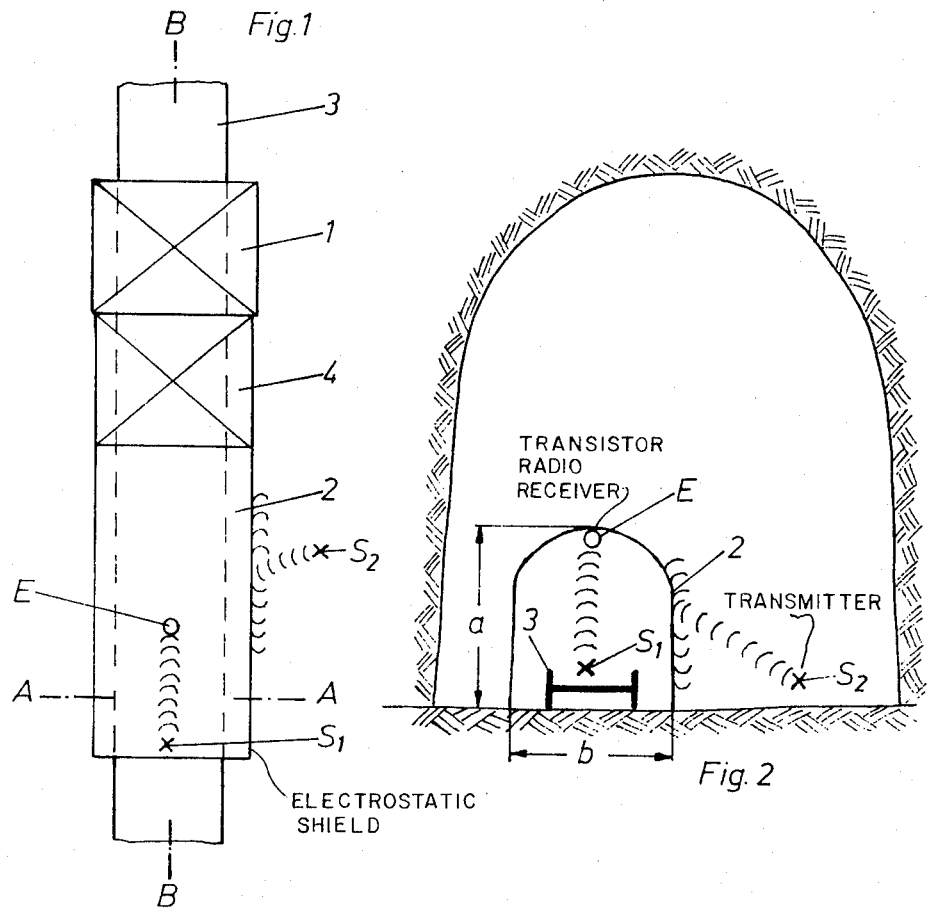
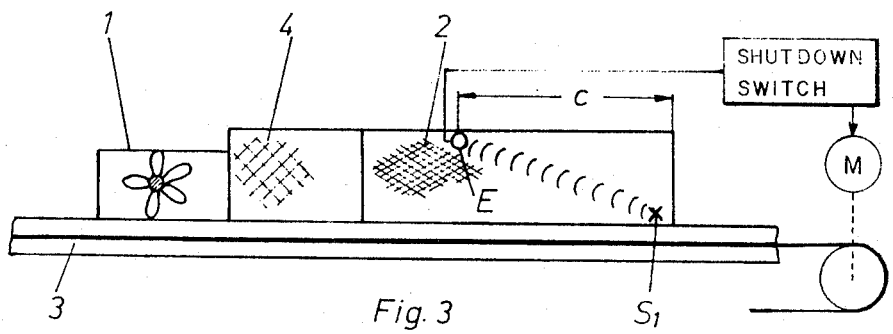

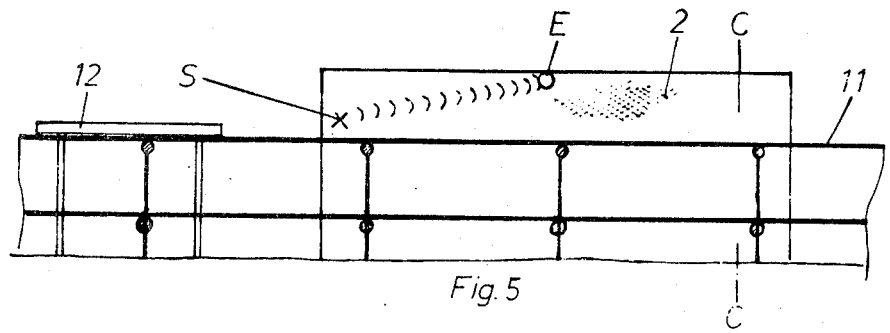
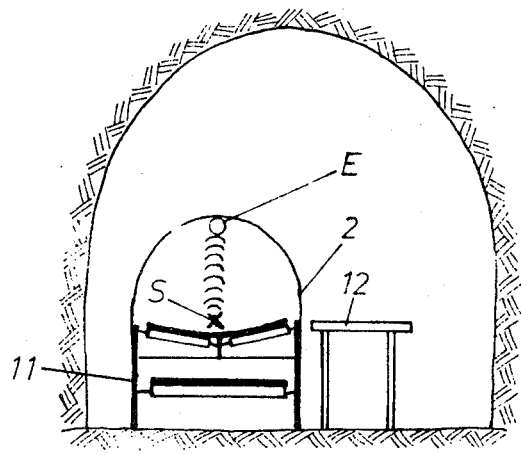
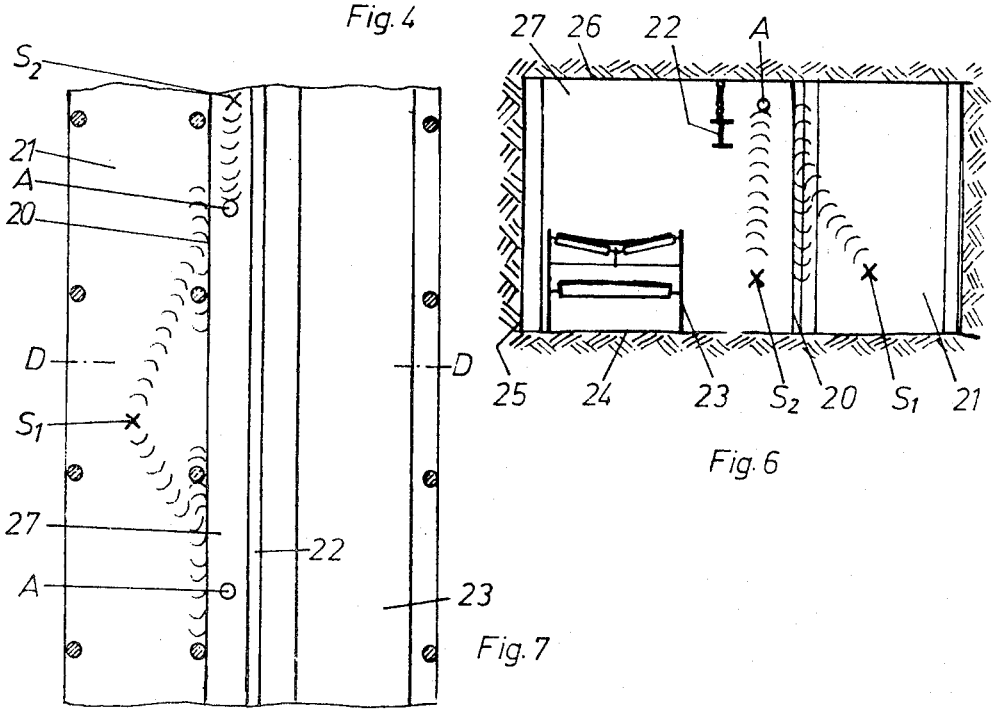

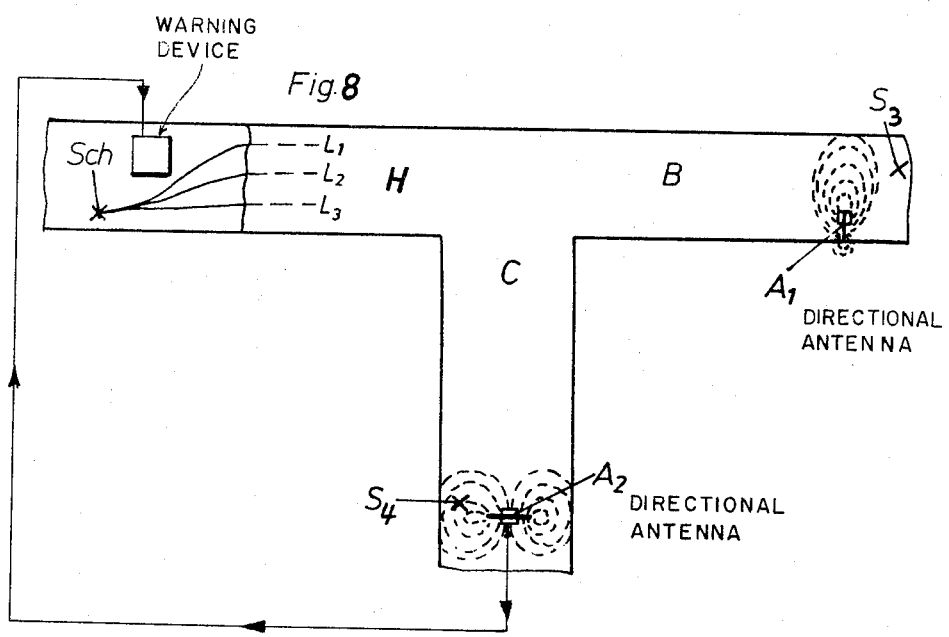
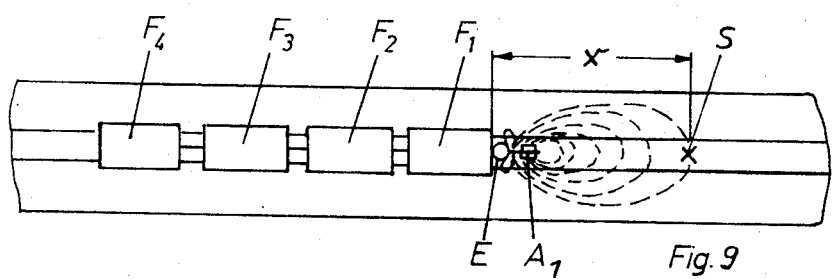

SYSTEM FOR PROTECTING PERSONS UNDERGROUND FROM DANGEROUS AREAS

BACKGROUND OF THE INVENTION

The invention relates to a system for protecting persons who are engaged in underground operations from dangerous areas.

An important problem of underground operations is the automatic protection of persons engaged in certain kinds of work against any dangers that might occur, or the automatic counting of persons, or the automatic location of persons in spite of poor visibility, as caused, for example, by fire or an explosion, or the automatic location of persons buried by a collapsing support or section.

For the location of persons buried alive in mine disasters, the German Petty Pat. No. 6,805,398 suggests that the headlamp of each miner should be equipped with a transmitter, the signal of which can be detected. This arrangement, however, leaves unsolved other equally important aspects of the problem of mine safety, such as the protection of persons in dangerous areas or the counting of persons to ensure that an unsafe number of persons do not ride in the cage.

BACKGROUND OF THE INVENTION

An object of the invention is a safety system that protects persons from dangerous areas underground in an effective way, such as by sounding a warning, by stopping the operation of some machine, or by counting.

Briefly, the invention consists of a continuously operating radio transmitter carried by each person, signal reception means, such as a radio receiver or an antenna, positioned with respect to a dangerous area so as to receive the signal transmitted by the transmitter whenever the person by his physical presence is endangered by the area, and electric means connected to the signal reception means for responding to a signal and protecting the person from the danger threatened by the area.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a top view of one embodiment of the invention;

FIG. 2 is a view in cross-section taken along line A—A of FIG. 1;

FIG. 3 is a longitudinal sectional view taken along line B—B of FIG. 1;

FIG. 4 is a view in cross-section of a second embodiment, taken along line C—C of FIG. 5;

FIG. 5 is a side view of the second embodiment of the invention;

FIG. 6 is a view, in cross-section taken along line D—D of FIG. 7 of a third embodiment of the invention;

FIG. 7 is a top view of the third embodiment;

FIG. 8 is a top view of the fourth embodiment of the invention;

FIG. 9 is a side view of a still further embodiment of the invention;

DESCRIPTION OF THE PREFERRED EMBODIMENTS

Figure 10:
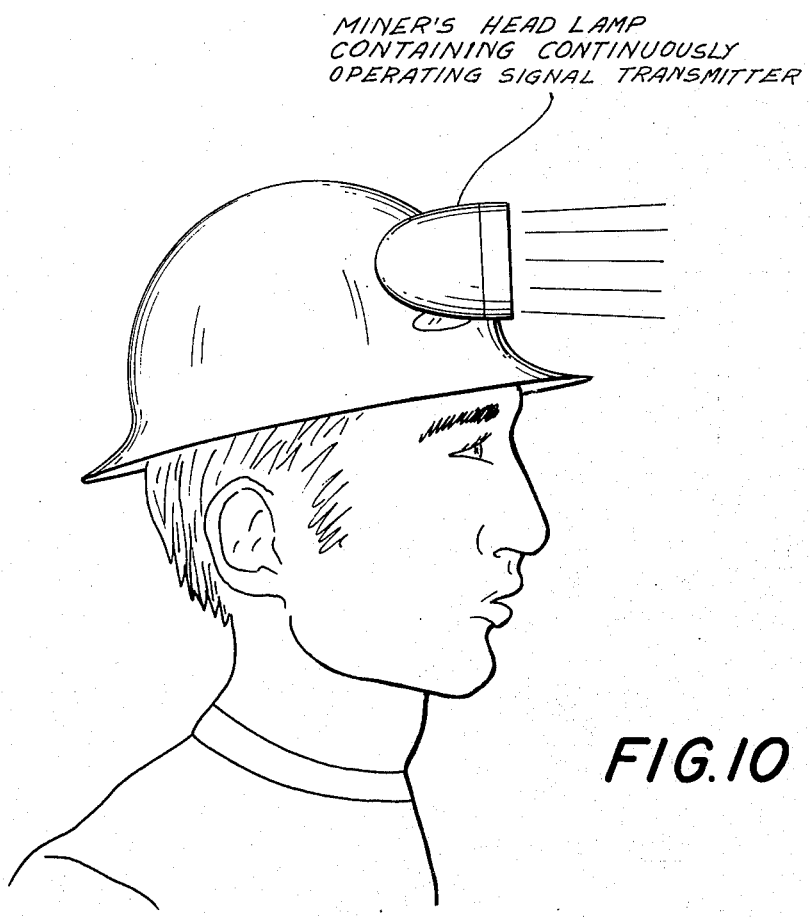
FIG. 10 depicts a miner's helmet and head lamp provided with a continuously operating signal transmitter.

In accordance with one advantageous embodiment of the invention, a Faraday shield cage partly encloses a length of the belt or scraper conveyor. Within the cage at least one radio receiver or antenna is placed at a known distance from the entrance. This arrangement ensures that workers are protected from a particularly dangerous part of a conveyor, such as the feed side of a crushing machine or the delivery end. As soon as a worker equipped with a radio transmitter enters the cage and so doing exposes himself to great danger, a radio receiver causes the conveyor to be stopped. If a person equipped with a transmitter passes by the cage, and safely remains outside of the cage, the receiver does not detect any signal from the transmitter, because the person is not endangered.

This embodiment of the invention is shown in FIGS. 1, 2 and 3. A protective screen 2, in the form of an electrostatic shield, such as a Faraday cage, which can be combined with the conventional mechanical protective screen 4, is positioned in front of a coal crusher 1 and partly encloses a length of the belt or scraper conveyor 3. A receiver E is placed within the cage 2. The signal of the transmitter $S_2$ of a person passing by the cage is not detected by the receiver E, because of the electrostatic shielding of the cage 2. As soon, however, as a person enters the Faraday cage (because of an accident, for example), the receiver E detects the signal from the transmitter $S_1$, and the conveyor 3 is stopped. In order to ensure that the conveyor stops in time, the length of the Faraday cage is determined by the path length travelled by the conveyor before it comes to a stop. The measurements a and b of the entrance to the Faraday cage are smaller than the distance c of the receiver E from the entrance, so that the receiver E detects only the signal of those transmitters (in the present instance the transmitter $S_1$) that are already within the cage.

With reference to FIGS. 4 and 5, a Faraday cage, composed of the protective screen 2, is positioned behind a descent place 12 to surround partly a belt conveyor 11. A receiver E is located within the cage. If a person enters the cage, the signal from his transmitter S is detected by the receiver E, and the conveyor is stopped, so that the endangered person can leave the conveyor in front of the danger point, which, for example, can be a conveyor delivery or a bunker feed.

In a further advantageous embodiment of the invention, the Faraday cage can consist of an electrically conductove partition and of the top, side, and bottom surfaces of the underground working, which surfaces in whole or in part can be electrically conductive. The partition separates a roadway for workers from the track conveyor, which is preferably a monorail conveyor, the antennas being spaced along the length of the track. This embodiment enables the guarding of a large space, such as a long length of conveyor track or a loading point, so that the signal of the transmitter carried by anyone entering the space will be picked up by the antennas and conducted to a receiver, which stops the conveyor, prevents the conveyor from being started, or operates a warning signal.

FIGS. 6 and 7 show this embodiment, in which every person carries a transmitter in his helmet lamp, a radio receiver (not shown) being mounted, for example, in the winch control cab of the monorail conveyor. The receiver delivers a signal to warn or to shut off the winch drive when someone with the transmitter $S_2$ enters the dangerous area of the conveyor track 27, which is separated from the roadway 21 by the wire screen 20. The conveyor track includes both the monorail conveyor 22 and the belt conveyor 23. The antennas A are spaced along the track near the roof, and the receiver is located in the winch control cab. The wire screen partition 20 and the surfaces 24, 25, and 26 in the conveyor tracks 27 constitute a Faraday cage, so that the signal from the transmitter $S_1$ of a person in the safe roadway 21 is not picked up by the antennas A. In this embodiment as in the previous ones, the Faraday screening ensures that only the signal from the transmitter $S_2$ of a person within the danger zone can cause a warning signal or stopping of the conveyor.

In accordance with still another preferred embodiment of the invention, radio receivers with directional antennas, preferably ferrite antennas, can be positioned in the approaches to the dangerous areas. The directivity of the antennas can be parallel, perpendicular, or inclined to the axis of the underground working. The receiver detects only the signals of the transmitters of those persons who are greatly endangered as soon as they enter the pickup zone of the receiver, as determined by the directional characteristics of the antenna and the sensitivity of the receiver. This pickup zone constitutes the warning area that delimits the dangerous area. The signals of the transmitters of those persons who are not endangered are not received. Ferrite antennas are advantageously used because of their favorable directional characteristics.

This embodiment is shown in FIG. 8, in which are illustrated two directional antennas $A_1$ and $A_2$ (in the present embodiment ferrite antennas), the antenna $A_1$ having a single lobe and the antenna $A_2$ having two lobes, the two antennas being connected to the inputs of respective receivers, not shown. The receiver sends a signal to the detonator Sch, who is preparing to blast the holes $L_1$, $L_2$, and $L_3$ in the floor of the length H, and/or a warning signal, when persons equipped with the transmitters $S_3$ and $S_4$ are about to enter the danger zone H by way of the approaches B and C. The detonator receives the signal and/or warning signal as soon as the persons enter the area, shown in dashed line, of the directional pattern of the antenna $A_1$ or $A_2$.

In a still further embodiment of the invention, a directional antenna can be mounted in front of a train or of an overhead conveyor, such as a monorail conveyor, the directional pattern of the antenna extending in front of the train or conveyor and embracing a volume of which the cross-section is larger than the cross-section of the train or conveyor. When a person equipped with a transmitter is within this volume, either a warning is sounded or the train is stopped before harm is done.

This embodiment is illustrated in FIG. 9. When a person with a transmitter S is located in the path of a train, consisting of the four cars $F_1$, $F_2$, $F_3$ and $F_4$, either a warning is sounded or the train is stopped. The first car $F_1$ carries a directional antenna $A_1$, preferably a ferrite antenna, having a single lobe, the associated receiver E detecting the signal of the transmitter S from a predetermined distance $x$. The receiver either causes a warning signal to sound or the train to stop.

The design of the receivers E can be very simple, since they only control mechanical arrangements, warning signal generators, counters, and gates. Simple transistor circuits, powered by any suitable source, preferably by a self-contained source, are desirable.

The antennas used in the Faraday cages are preferably ferrite antennas, the pickup ranges of which can be varied. The directivity of the ferrite antenna enables the reception range of the receiver to be controlled in a very exact manner.

Figure 11:
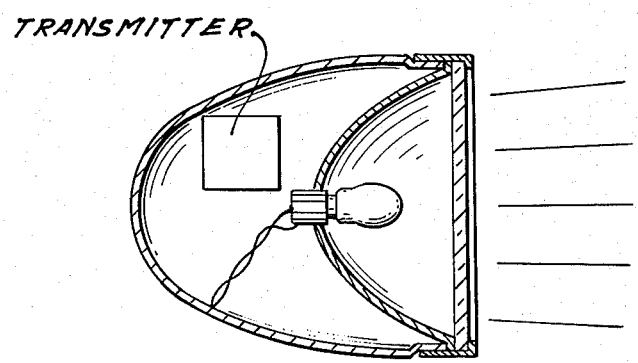
FIG. 11 depicts details of the head lamp shown in FIG. 10.

In accordance with the invention, the transmitters are preferably permanently mounted in the helmet lamps. This is shown in FIGS. 10 and 11. This ensures that all persons underground are necessarily part of the automatic safety system. The system is made independent of human frailties by having the transmitter operated at all times, except when the battery of the helmet lamp is being recharged. The transmitter has no means that enables the wearer to shut it off.

The frequency of the transmitters is advantageously within the narrow range of 600 to 1000 kilocycles, because then the safety system of the invention can use the same transmitters and frequency as are suggested in the German Petty patent No. 6,805,398 that describes a position locator for persons buried alive. If the safety system of the invention is not used in conjunction with the aforesaid position locator, other frequencies, lying outside of this band, can be used.

The reliability of the safety system must be very high. A defective transmitter must be discovered in time and removed in order to ensure that the entire safety system functions in the intended manner. This can be done in the manner that a stationary testing receiver is installed between the lamp room and the shaft. The testing receiver can be contained within a Faraday screen cage or else provided with a directional antenna, so that the output from a properly operating transmitter causes the testing receiver to light up a sign that informs the person that his transmitter is operating properly. The signal from the receiver can also be used to unlock a turnstile, those persons with defective transmitters being prevented from leaving the lamp room to enter the shaft.

The arrangement, in accordance with the invention, of the receiver, or only one or more antennas of the receiver, within the Faraday cage or—if the antennas are directional—at the approach to the danger areas ensures that the receiver detects a signal and operates some device to protect the person only when that person enters the Faraday cage or comes within the reception range of the receiver either voluntarily or because of an accident.

By variously designing and arranging the antennas within the Faraday cage in conjunction with the dimensions of the cage (ratio of the entrance width of the cage to the width of the space within the page)—as well as in conjunction with the chosen sensitivity of the receiver—the screening effect of the cage and thus the necessary demarcation of the space within which the receiver can detect a signal are adjustable between wide limits and can be made to suit each individual case. This adaptability is also present with directional antennas, which can be designed and arranged in conjunction with the characteristics of the receiver to suit different requirements. The system of the invention ensures, in a simple manner, the automatic protection against the larger part of all dangerous areas underground.

It will be understood that each of the elements described above, or two or more together, may also find a useful application in other types of arrangements differing from the types described above.

While the invention has been illustrated and described as embodied in a system for protecting persons underground from dangerous areas, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A system for protecting persons engaged in underground operations from danger areas, comprising in combination a plurality of miner's head lamps; a plurality of continuously operating signal transmitters each connected to a respective one of said miner's head lamps in such a manner that when the head lamps are worn the signal transmitters must be carried along by the wearers; signal reception means positioned at a danger area and responsive to signals transmitted by said signal transmitters; means for establishing a definite zone within which a transmitter must be located to be detected by said reception means; and electric means for automatically initiating a safeguarding operation when a respective one of said transmitters enters said zone.

2. The system as defined in claim 1, said means for establishing, including a partly open electrostatic shield cage adapted to enclose partly the dangerous area, and wherein said signal reception means is so positioned within said electrostatic shield cage that the former receives a signal from said radio transmitter only when one of said transmitters is also within said electrostatic shield cage.

3. The system as defined in claim 2, wherein said signal reception means comprises an antenna.

4. The system as defined in claim 3, wherein said antenna is directional.

5. The system as defined in claim 2, wherein said signal reception means comprises a radio receiver.

6. The system as defined in claim 2, wherein a conveyor is the object of danger within the dangerous area and said shield cage partly encloses at least a length of the conveyor, said shield cage being open at at least one end for the conveyor, said signal reception means being positioned within said cage at a predetermined distance from one end thereof, and further wherein said electric means is a switch for stopping the conveyor whenever said signal reception means receives a signal.

7. The system as defined in claim 6, wherein said shield cage includes an electrically conductive partition located between a roadway for the persons underground and the conveyor, and further wherein said signal reception means is a plurality of antennas spaced along the length of the conveyor and within said shield cage.

8. The system as defined in claim 7, wherein the remaining interior surfaces of said shield cage, aside from said partition, are composed of the surfaces of the underground space.

9. The system as defined in claim 7, wherein the conveyor is a track conveyor.

10. The system as defined in claim 1, wherein said signal reception means comprises directional antenna means.

11. The system as defined in claim 10, wherein a train is the object of danger within the dangerous area, and said directional antenna means is mounted on the train in front thereof so that the range of reception is located in the direction of forward movement of the train.

12. The system as defined in claim 11, wherein the pickup pattern of said directional antenna means embraces, in front of the train, a volume of which the cross-section is larger than the cross-section of the train.

13. The system as defined in claim 11, wherein said electric means is a switch for stopping the train whenever said directional antenna means receives a signal.

14. The system as defined in claim 1, wherein said signal reception means comprises a transistor radio receiver.

15. The system as defined in claim 1, wherein said signal reception means includes a ferrite antenna.

16. The system as defined in claim 1, wherein said radio transmitter is mounted in the helmet lamp of the person and powered by the battery of the helmet lamp, and further wherein said radio transmitter has no switch that can be turned off by the person wearing the helmet lamp.

17. A system as defined in claim 1, wherein said electric means is a warning device.

* * * * *